(12) United States Patent
Pasquero et al.

(10) Patent No.: US 8,972,241 B2
(45) Date of Patent: Mar. 3, 2015

(54) ELECTRONIC DEVICE AND METHOD FOR A BIDIRECTIONAL CONTEXT-BASED TEXT DISAMBIGUATION

(75) Inventors: Jerome Pasquero, Kitchener (CA); Noel John Orland Stonehouse, Waterloo (CA); Daniel James Legg, Kitchener (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 244 days.

(21) Appl. No.: 13/460,772

(22) Filed: Apr. 30, 2012

(65) Prior Publication Data

US 2013/0289975 A1  Oct. 31, 2013

(51) Int. Cl.
*G06F 17/27* (2006.01)
*G06F 17/20* (2006.01)
*G06F 17/21* (2006.01)

(52) U.S. Cl.
USPC ..................... 704/9; 704/1; 704/10

(58) Field of Classification Search
CPC ...................................... G06F 17/02
USPC ..................... 704/1, 9, 10; 715/261
See application file for complete search history.

(56) References Cited

U.S. PATENT DOCUMENTS 5,634,084 A   5/1997   Malsheen et al.
7,640,233 B2  12/2009  Baartman et al.
7,809,719 B2  10/2010  Furuuchi et al.
7,827,315 B2  11/2010  Kirkland
8,065,453 B2  11/2011  Fux (Continued)

FOREIGN PATENT DOCUMENTS

DE   112007000847    2/2009
WO      2007112542   10/2007

(Continued)

OTHER PUBLICATIONS

PCT Notification of Transmittal of the International Search Report and the Written Opinion of the International Searching Authority for International Application No. PCT/CA2012/050273, mailed Jan. 23, 2013, 11 pages.

(Continued)

*Primary Examiner* — Jesse Pullias
(74) *Attorney, Agent, or Firm* — Fish & Richardson P.C.

(57) ABSTRACT

A system and method provide bidirectional context-based text disambiguation. In one implementation, a processor receives an input text comprising a set of string objects, which may include ambiguous objects such as incomplete or unrecognizable words of a selected language. The processor identifies a set of candidate word objects corresponding to at least a first one of the string objects and a second one of the string objects. Each candidate word object represents, for example, a complete or recognizable word of the selected language. The processor outputs a selected word object in place of a first one of the string objects, as a function of a contextual comparison between one or more candidate word objects corresponding to the first string object and one or more candidate word objects corresponding to the second string object.

15 Claims, 4 Drawing Sheets

(56) References Cited

U.S. PATENT DOCUMENTS

| | | | |
|---|---|---|---|
| 2006/0155662 A1* | 7/2006 | Murakami et al. | 706/20 |
| 2007/0076862 A1* | 4/2007 | Chatterjee et al. | 379/433.06 |
| 2007/0136688 A1* | 6/2007 | Mirkin et al. | 715/816 |
| 2008/0281583 A1* | 11/2008 | Slothouber et al. | 704/10 |
| 2008/0305815 A1 | 12/2008 | McDonough | |
| 2009/0077494 A1* | 3/2009 | Sjolin | 715/810 |
| 2010/0031143 A1 | 2/2010 | Rao et al. | |
| 2010/0122164 A1 | 5/2010 | Kay et al. | |
| 2011/0016389 A1 | 1/2011 | Gordon et al. | |
| 2011/0193797 A1* | 8/2011 | Unruh | 345/173 |
| 2011/0313756 A1 | 12/2011 | Connor | |

FOREIGN PATENT DOCUMENTS

| | | |
|---|---|---|
| WO | 2007112543 | 10/2007 |
| WO | 2011092691 | 8/2011 |

OTHER PUBLICATIONS

Communication from the European Patent Office enclosing the Extended European Search Report for European Application No. 12166114.4, dated Aug. 20, 2012 (5 pages).

Arnon et al.; "More Than Words: Frequency Effects for Multi-Word Phrases"; Journal of Memory and Language; vol. 62; 2010; pp. 67-82.

Nandi et al.; "Effective Phrase Prediction"; Proceedings of the 33rd International Conference on Very Large Databases; VLDB Endowment; 2007; pp. 219-230.

International Preliminary Report on Patentability under Chapter I issued in International Application No. PCT/CA2012/050273 on Nov. 13, 2014; 7 pages.

Office Action issued in German Application No. 112012000288.1 on Dec. 3, 2014; 6 pages. No translation.

* cited by examiner

ELECTRONIC DEVICE AND METHOD FOR A BIDIRECTIONAL CONTEXT-BASED TEXT DISAMBIGUATION

FIELD OF TECHNOLOGY

The disclosed and claimed concept relates generally to electronic devices and, more particularly, to an electronic device having a keyboard and a text input disambiguation function that can employ contextual data.

BACKGROUND

Electronic devices, including portable electronic devices, have gained widespread use and may provide a variety of functions including, for example, telephony, text messaging, web browsing, or other personal information manager (PIM) functions such as a calendar application. Portable electronic devices include several types of devices such as cellular telephones (mobile phones), smart telephones (smart phones), Personal Digital Assistants (PDAs), tablet computers, or laptop computers, with wireless network communications or near-field communications connectivity such as Bluetooth® capabilities.

Portable electronic devices such as smart phones, tablet computers, or PDAs are generally intended for handheld use due to their small size and ease of portability. A touch-sensitive input device, such as a touchscreen display, is desirable on handheld devices, which are small and may have limited space for user input or output devices. Improvements in electronic devices with displays are desirable.

BRIEF DESCRIPTION OF THE DRAWINGS

Embodiments of the present disclosure will now be described, by way of example only, with reference to the attached Figures, wherein.

DETAILED DESCRIPTION

The present disclosure describes a context-based text disambiguation method. The method, which is performed by at least one processor, comprises receiving an input text comprising a set of string objects, which may include ambiguous objects in the sense that some of the string objects represent, for example, incomplete or unrecognizable words of a selected language. Next, the processor identifies a set of candidate word objects corresponding to at least a first one of the string objects and a second one of the string objects. Each candidate word object represents, for example, a complete or recognizable word of the selected language. The processor then outputs a selected word object, for example, in place of a first one of the string objects, as a function of a contextual comparison between one or more candidate word objects corresponding to the first string object and one or more candidate word objects corresponding to the second string object.

Figure 1:
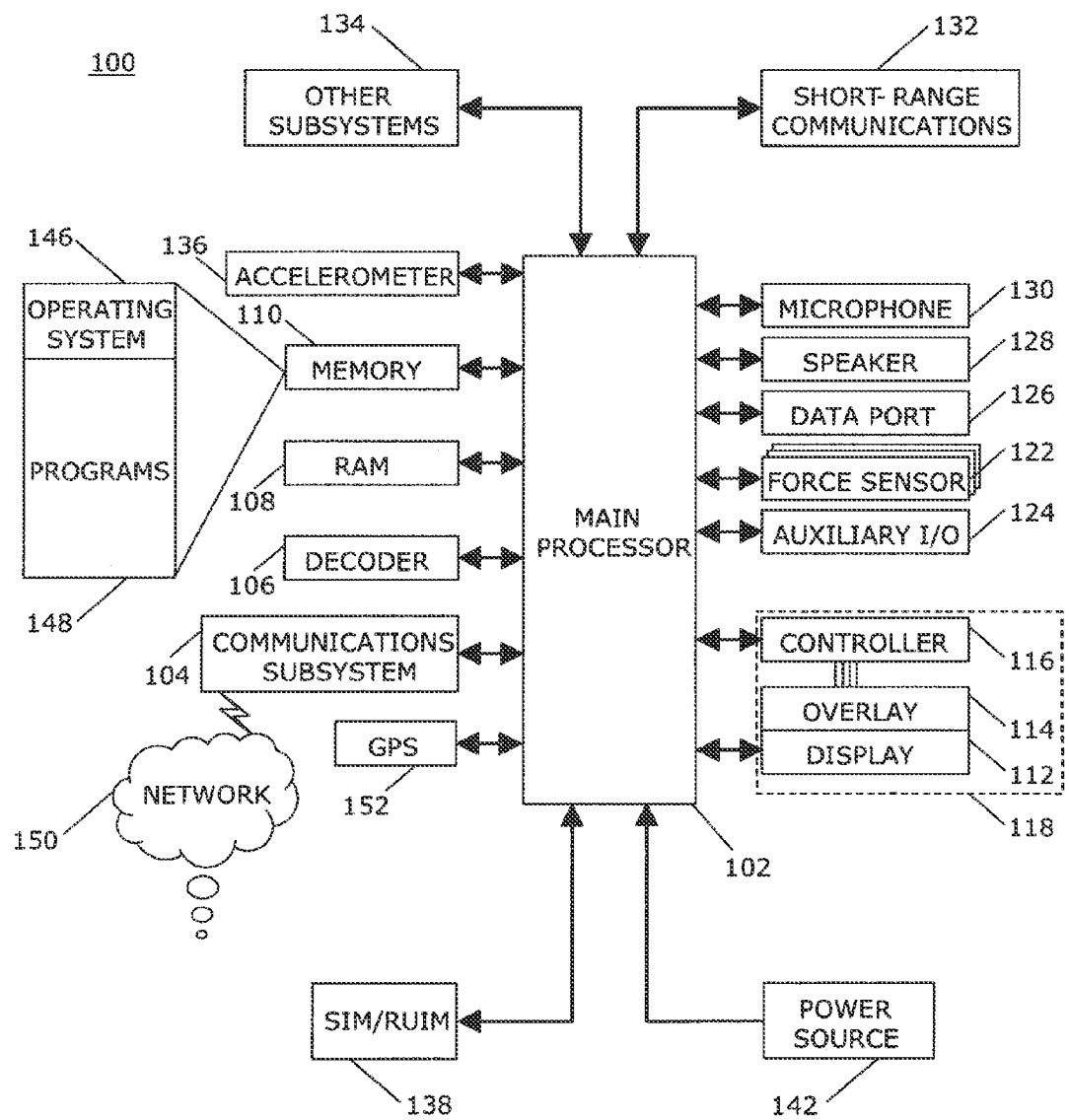
FIG. 1 is a block diagram of an example of a portable electronic device in accordance with the present disclosure.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communications subsystem 104 and a short-range communications 132 module to perform various communication functions, including data and voice communications. Data received by the portable electronic device 100 is decompressed and decrypted by a decoder 106. The communications subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 is coupled to and interacts with other components, such as Random Access Memory (RAM) 108, memory 110, a display 112. In the example embodiment of FIG. 1, the display 112 is coupled to a touch-sensitive overlay 114 and an electronic controller 116 that together comprise a touch-sensitive display 118. The processor 102 is also coupled to one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 to detect direction of gravitational forces or gravity-induced reaction forces so as to determine, for example, the orientation of the portable electronic device 100. The processor 102 may interact with a GPS module 152 in order to determine the geographical location of the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communications subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communications subsystem 104, for example.

Figure 2A:
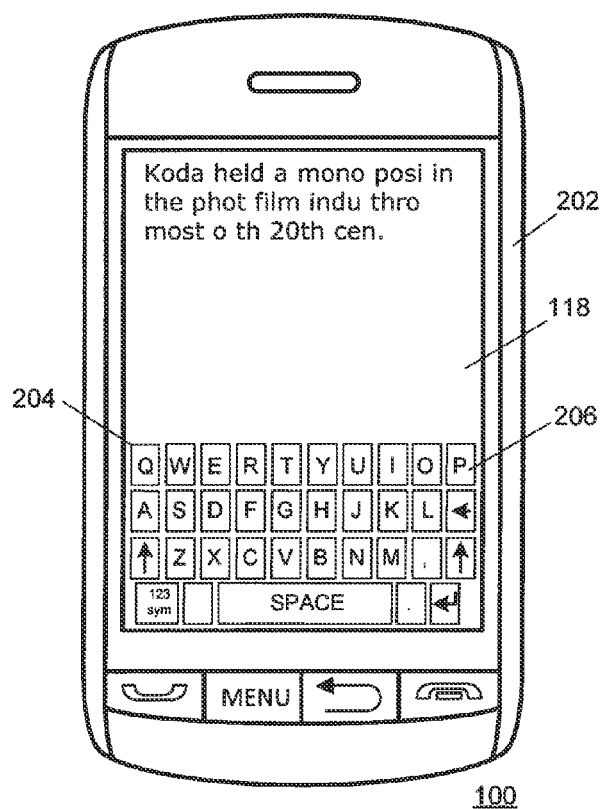
FIG. 2A is a schematic depiction of the portable electronic device, in accordance with the present disclosure.

A front view of an example of the portable electronic device 100 is shown in FIG. 2A. The portable electronic device 100 includes a housing 202 in which the touch-sensitive display 118 is disposed. The housing 202 is an enclosure that contains components of the portable electronic device 100, such as the components shown in FIG. 1.

A keyboard 204 may be a physical keyboard within the housing 202, or a virtual keyboard rendered as a GUI displayed on the touch-sensitive display 118 as illustrated by the example embodiment of FIG. 2A. As shown in FIG. 2A, the keyboard 204 is a GUI rendered on the touch-sensitive display 118 and has a QWERTY keyboard layout. In alternate example embodiments, other keyboard layouts such as QWERTZ, AZERTY, Dvorak, or the like, may be utilized. Similarly, reduced keyboards having two or more characters associated with certain keys, such as a reduced QWERTY keyboard layout, can be contemplated. For example, a reduced QWERTY keyboard may be provided in which the letters Q and W share a single key, the letters E and R share a single key, and so forth.

The keyboard 204 may be rendered in any suitable program or application such as a web browser, text messaging (e.g., SMS), email client, contacts, calendar, music player, spreadsheet, word processing, operating system interface, and so forth for text input. Other information such as text, characters, symbols, images, and other items may also be displayed, for example, as the keyboard 204 is utilized for data entry. The keyboard 204 includes a plurality of keys 206, each key associated with at least a character or a function as indicated by indicia displayed thereupon.

Figure 2B:
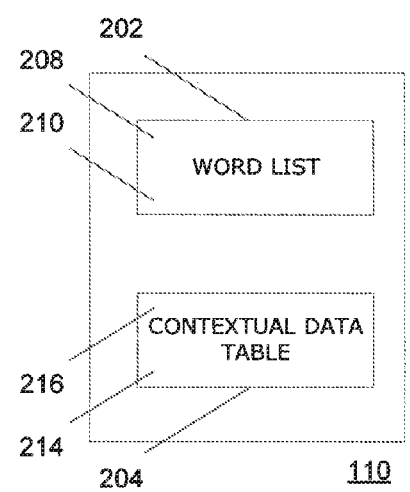
FIG. 2B is a schematic depiction of a memory of the portable electronic device, in accordance with the present disclosure.

The memory 110 is depicted schematically in FIG. 2B. The memory 110 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory.

As can be understood from FIG. 2B, the memory 110 includes, for example, data stored and/or organized in a number of tables, sets, lists, and/or otherwise. Specifically, the memory 110 includes a word list 202 and a contextual data table 204. Stored within the word list 202 are a number of word objects 208 and frequency objects 210. The word objects 208 generally are each associated with a frequency object 210. The word objects 208 are generally representative of complete words.

Associated with substantially each word object 208 is a frequency object 210 having frequency value that is indicative of the relative frequency within the relevant language of the given word represented by the word object 208. In this regard, the word list 202 includes a plurality of word objects 208 and associated frequency objects 210 that together are representative of a wide variety of words and their relative frequency within a given vernacular of, for instance, a given language. The word list 202 can be derived in any of a wide variety of fashions, such as by analyzing numerous texts and other language sources to determine the various words within the language sources as well as their relative probabilities, i.e., relative frequencies, of occurrences of the various words within the language sources.

The portable electronic device 100 also includes a contextual data table 204 stored in the memory 110. The contextual data table 204 can be said to have stored therein a number of string objects and associated context data.

Specifically, the contextual data table 204 comprises a number of key objects 214 and, associated with each key object 214, a number of associated contextual objects 216. In the example embodiment, in which the English language is employed on the portable electronic device 100, each key object 214 is a word object 208. That is, a key object 214 in the contextual data table 204 is also stored as a word object 208 in one of the word list 202. Each key object 214 has associated therewith one or more contextual value objects 216 that are each representative of a particular contextual data element.

The contents of the contextual data table 204 are obtained by analyzing the language objects 100 and the data corpus from which the language objects 100 and frequency objects 210 were obtained. A particular contextual object 216 is associated with a particular key object 214 when there is any statistically significant coincidence between the two objects, that is, when there is some statistically significant likelihood that the particular key object 214 would appear in the context of the particular contextual value 216, or vice versa.

One example of a context is that in which a particular key object 214 follows or precedes, to a statistically significant extent, a particular word. For instance, it could be determined that the key word "POSITION" occurs, to a statistically significant extent, after the context word "MONOPOLY," and that the key word "20th" occurs, to a statistically significant extent, before the context word "CENTURY." Depending upon the configuration of the contextual data table 204, such a context might be limited to a particular context object that immediately precedes or follows a particular key word, or it might include a particular context object that precedes or follows a particular key object by either exactly, or a maximum of, one, two, three, or more words. In some embodiments, a context includes more than one word, for example, the words "happy new", are statistically likely to appear before the word "year." In some embodiments, some contextual associations are weighed more heavily than others, the weights depending, for example, on the correlation level characterizing the particular association.

Another example of a context is that in which a particular string object is, to a statistically significant extent, a first word in a sentence. In such a situation, the identified context might be that in which the particular string object follows, to a statistically significant extent, one or more particular punctuation marks such as the period ".", the question mark "?", and the exclamation point "!". In such a situation, the contextual object 216 would be the particular punctuation symbol, with each such statistically significant punctuation symbol being a separate contextual object 216.

The contextual objects 216 can each be stored as a hash, i.e., an integer value that results from a mathematical manipulation. For instance, the contextual object 216 "MONOPOLY", while being a word object 208, can be stored in the contextual data table 204 as a hash of the word "MONOPOLY". The key objects 214, such as the word "POSITION" can similarly each be stored as a hash.

In an example embodiment, the memory 110 includes a text disambiguation routine for resolving input texts comprising string objects. String objects may occur, for example, when the user enters the text using a reduced keyboard, wherein some keys correspond to more than one character. In systems with full keyboards, the user can, in the interest of time, deliberately input partial (and therefore ambiguous) string objects, relying on the disambiguation routine to automatically resolve the ambiguities and to correctly complete the string objects.

In an example embodiment, the user inputs a text comprising a plurality of string objects. For instance, the user desires to input the following text: "Kodak held a monopoly position in the photographic film industry throughout most of the 20th century". In the interest of time, the user inputs the following text, instead: "Koda held a mono posi in the phot film indu thro most o th 20th cen." The text comprises numerous string objects, i.e., partial strings of characters that correspond to two or more complete words. The user can use any number of characters for each string object: only the first character (e.g., "o"), the first two, three or more characters (e.g., "th", "cen", "posi"), or the entire word (e.g., "held", "most" and "20th").

The processor 102 receives the input text and breaks it into a plurality of string objects, where each string object includes at least one character. For simplicity and without limiting the generality, each string of characters within the input text is referred to herein as a string object, whether a particular string of characters happens to correspond to a complete word or not.

Figure 3A:
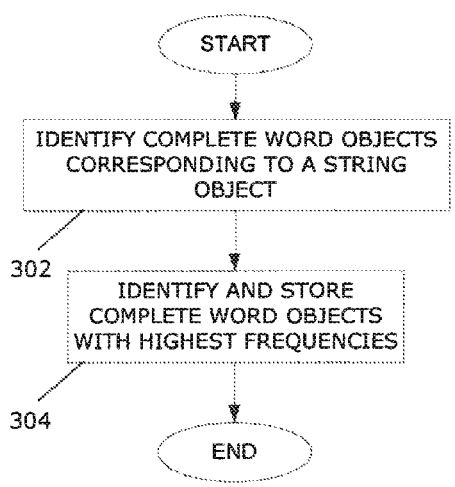
FIG. 3A is a flowchart of an example candidate selection routine, in accordance with the present disclosure.

In an example embodiment, the processor 102 processes each string object using a candidate selection routine, as illustrated in the flowchart in FIG. 3A. The candidate selection routine consults the memory 110 to identify at 302 one or more complete word objects 208 that correspond to the current string object. A complete word object 208 is said to correspond to a string object when, for example, the string object is either a prefix of the complete word object 208 or would be substantially identical to the entirety of the complete word object 208. In some embodiments, the candidate selection routine anticipates that the user could have mistyped a string object and also identifies complete word objects 208 that have prefixes similar to the string object. For example, the routine may identify a complete word object 208 "sound" to correspond to the string objects "soi" or "soin," anticipating a potential typo, since characters "i" and "u" are closely positioned on a QWERTY keyboard.

Next, the candidate selection routine selects at 304, among all the identified complete word objects 208, those objects that are associated with frequency objects 210 having relatively high frequencies. For example, the candidate selection routine selects N complete word objects 208 with that are associated with N frequency objects 210 having the highest frequencies. N could be any number and may vary from one string object to another. That is, the candidate selection routine can select as few as one complete word object 208 for one string object, and as many as a hundred complete word objects 208 for another string object. In some embodiments, the number of selected complete word objects 208 is not limited, and the selection routine can keep processing objects until it is interrupted, for example, by an input from the user. In some embodiments, in addition to frequencies, the candidate selection routine takes into account the length of the complete word objects 208, as it relates to the length of the string object, for example. For instance, shorter complete word objects 208 may be preferred when the string object is shorter.

Once one or more complete word objects 208, hereinafter referred to as "candidates," are selected, they are temporarily stored at 304 in the memory 110. The candidate selection routine then ends, and the processor 102 can run the routine on another string object.

At any point in time, for example, when all the string objects within the input text have been processed by the candidate selection routine, the processor 102 selects a set of two or more string objects and processes that set of string objects with a context-based optimization routine. The context-based optimization routine obtains from the memory 110 all candidates stored for each of the string objects in the set, and prioritizes the candidates of each string object based on the number of contextual associations between each candidate and the candidates of other string objects within the set.

The processor 102 can run the context-based optimization routine several times, each time including a different, potentially overlapping, set of string objects. The processor 102 does not have to wait for all string objects to be processed by the candidate selection routines before it starts running the context-based optimization routines. Generally, once any set of two or more string objects have been processed by the candidate selection routines, the processor 102 can run the context-based optimization routine on that set.

Figure 3B:
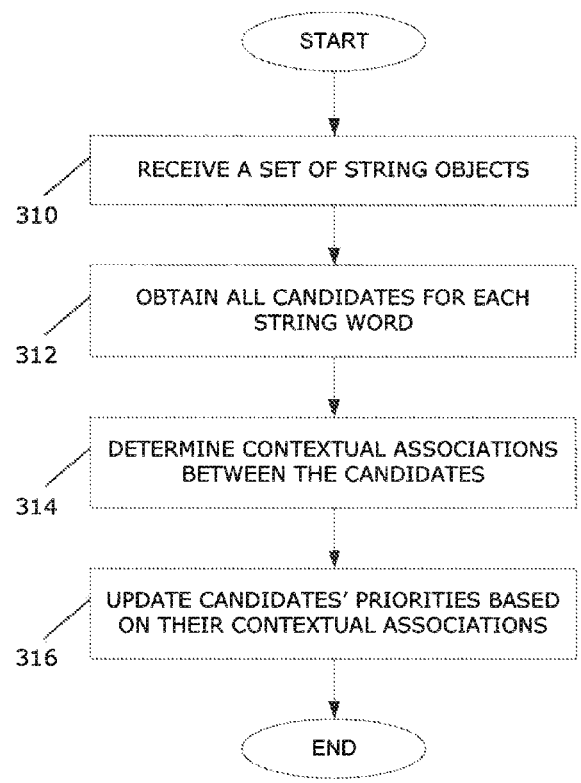
FIG. 3B is a flowchart of an example context-based optimization routine, in accordance with the present disclosure.

The flowchart in FIG. 3B illustrates a context-based optimization routine run by the processor 102, in accordance with an example embodiment. The context-based optimization routine begins by receiving at 310 a set of two or more string objects. At 312, the routine obtains, for each string object, all of its candidates. The candidates are obtained from the memory 110 where they have been temporarily stored for each string object by a corresponding candidate selection routine. At 314, the context-based optimization routine identifies, for each candidate of each string object, the number of contextual associations between that candidate and any of the candidates of any other string object. At 316, the routine updates the priorities of each candidate of each string object in the set based, for example, on to the number of contextual associates of that candidate. The context-based optimization routine then ends.

Figure 4:
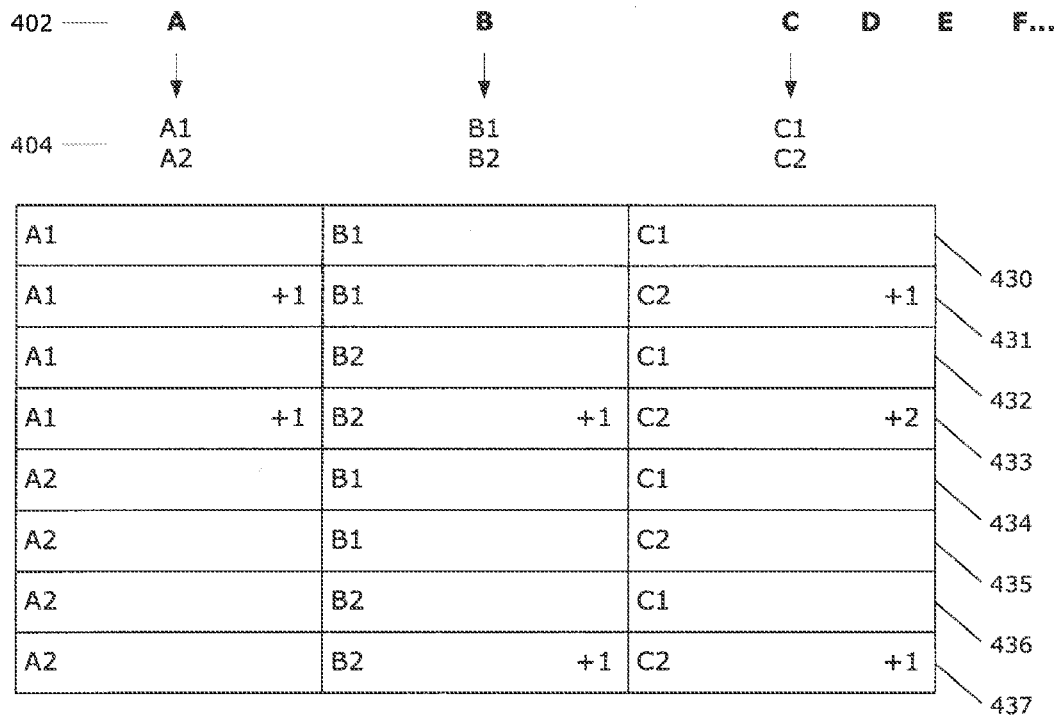
FIG. 4 is a schematic depiction of an example context-based optimization routine, in accordance with the present disclosure.

FIG. 4 illustrates the context-based optimization routine performed by the processor 102 on a set of three string objects, in accordance with an example embodiment. In the example embodiment, the input text consists of at least six string objects 402 referred to, for simplicity, as A, B, C, D, E and F. It is assumed that at least the string objects A, B and C have already been processed by the candidate selection routine, and as a result, candidates 404 for each of the three words have been produced and stored in the memory 110. For example, candidates A1 and A2 have been stored for the string object A, candidates B1 and B2 have been stored for the string object B, and candidates C1 and C2 have been stored for the string object C.

The context-based optimization analyzes, for example, eight possible permutations 430-438 of the candidates 404, each permutation forming a different combination of three candidates. For each permutation 430-438, the optimization pass determines whether any candidates within the permutation is contextually associated with any another candidate, that is, whether one of the candidates corresponds to a key object 214 and another candidate corresponds to a contextual object 216 associated with the key object 214. For each found contextual association, the optimization process increases the relative priorities of both the candidate corresponding to the key object 214 and the candidate corresponding to the contextual object 216.

For example, if the candidate C2 is contextually associated with the candidate B2 and its context corresponds to the position of C relative to B, the priorities of both candidates are increased, e.g., by 1, in each permutation wherein both C2 and B2 are present (permutations 433 and 437). Further, if C2 is also contextually associated with A1, then in permutations wherein both A1 and C2 are present (permutations 431 and 433) the priorities of both candidates are increased, as well. It will be noted that for each contextual association the routine determines whether the associated candidates are positioned within the input text according to the particular context. That is, if the context defining the association of A1 and C2 dictates that A1 must immediately precede C2, the routine would determine that there was no contextual association in the above example, because A1, while preceding C2, does not precede it immediately in the input text, as it is separated by another word.

The context-based optimization routine ends when all the permutations for the given set have been analyzed. The updated priorities for each candidate are stored, for example, in the memory 110, to be used in a subsequent run of the context-based optimization routine.

It will be noted, that instead or in addition to the described permutation technique, in some example embodiments, the processor 102 employs within the context-based optimization routine any other technique that considers contextual associations within the set of string objects and prioritizes the candidates of each string object based on the contextual associations. In one example, the processor 102 increases the priority of two contextually associated candidates only once, regardless to the number of permutations containing the two candidates. In another example, the processor 102 takes into account the correlation strength values corresponding to each contextual association. In yet another example, the candidate selection routine temporarily stores, along with the candidates, their respective frequency values. Consequently, in some example embodiments, the priority of each candidate is based on a combination of its intrinsic frequency value and its extrinsic, context-based associations with other string objects.

In an example embodiment, the processor 102 runs the context-based optimization routine one or more times, each time processing a different set of two or more string objects. Continuing the previous example, at any time after the string object D has been processed by the candidate selection routine, the processor runs the context-based optimization routine on the set of string objects B, C and D. The priority values updated during the previous run of the context-based optimization routine (where it processed string objects A, B and C) are maintained and are built upon at this subsequent run. Thus, the candidate B2 starts with the priority of "+2" and that priority will be further increased if, for example, it is contextually associated with any of the candidates of the string object D. The processor then runs the context-based optimization routine on the set of string objects C, D and E, then D, E and F, and so forth.

At any point in time when the processor 102 determines that a particular string object will not be further optimized, i.e., it will not be a part of another set to be processed by the context-based optimization routine, the processor 102 finalizes that particular string object. Finalizing a string object comprises selecting among its candidates the best candidate, for example, the candidate with the highest priority.

For instance, if the processor 102 runs the context-based optimization routine in the sliding-window manner described above, the processor 102 finalizes the string object A immediately after the set A, B, and C is processed. To finalize the string object A, the processor 102 selects the best candidate among A1 and A2. Since A1 and A2 have accumulated priorities of +2 and +0, respectively, A1 is selected as the best candidate for the string object A. Similarly, the processor 102 finalizes the string object B after the set B, C and D is processed, finalizes the string object C after the set C, D and E is processed, and so forth.

Thus, it will be noted the processor 102 advantageously employs a bidirectional disambiguation method, since a given string object is disambiguated based on information related to string objects both preceding and succeeding it in order. For example, in the above-illustrated example, the string object C participates in three different sets: A-B-C, B-C-E, and C-E-D). Consequently, the priorities of candidates C1 and C2 could be affected by contextual information belonging to any of the words A through D.

It will be noted that the context-based optimization is not limited to processing three string objects at a time, and can similarly process any number of words, such as complete sentences, paragraphs, and so forth. For example, the processor may run the context-based optimization only once, based on a set that includes all the string objects in the input text. The context-based optimization pass is also not limited to two candidates per string object, and can process string objects having one candidate in the same set with string objects having tens or hundreds of candidates.

In an example embodiment, when all string objects are finalized, the processor 102 displays the finalized words, i.e., the best candidate for each word, on the touch-sensitive display 118. Alternatively, the processor 102 does not wait for all words in the input text to be finalized and outputs one or more words as soon as they become finalized. Continuing the previous example, A1, the best candidate for the string object A, is output as soon as the string object A is finalized, that is, immediately after the processor 102 runs a context-based optimization on the set A, B and C.

In an example embodiment, the processor 102 outputs to the user several versions of finalized words. For example, the processor 102 first performs context-based optimizations based on one technique (e.g., using permutations and not using correlation levels) and then based on another technique (e.g., not using permutations but considering correlation levels). Depending on the technique used, different candidates may end up being selected as best candidates for some string objects. Consequently, the processor 102 displays several alternative versions on the touch-sensitive display 118. In an example embodiment, the processor 102 automatically replaces some or all string objects with the selected best candidates. In other example embodiments, the processor 102, after displaying one or more best candidates to the user, receives user's selection of the desired best candidates and replaces with the string objects with the selected best candidates. In some embodiments, the user can indicate which individual candidates are correct and which are incorrect. The processor 102 can then rerun the candidate selection routine and/or the context-based optimization routine based on that indication, for example, by "fixing" the correct candidates and finding, based on the fixed candidates, replacements for the incorrect candidates.

While specific embodiments of the disclosed and claimed concept have been described in detail, it will be appreciated by those skilled in the art that various modifications and alternatives to those details could be developed in light of the overall teachings of the disclosure. For example, the processing routines described herein (e.g., the candidate selection, context-based optimization, etc.) can be performed in part or in their entirety by a remote device, such as a server. Running computationally intensive tasks on a powerful remote device can be advantageous in terms of speed, as well as power savings. Additionally, all or parts of the stored data described herein (e.g., word list 202, contextual data table 204, etc.) can also be stored on a remote device, whether or not the computations are done remotely or on the electronic device 100.

Accordingly, the particular arrangements disclosed are meant to be illustrative only and not limiting as to the scope of the disclosed and claimed concept which is to be given the full breadth of the claims appended and any and all equivalents thereof.

The invention claimed is:

1. A method, performed by a processor, comprising:
receiving, by the processor, an input text comprising a set of string objects, each object comprising a single potentially ambiguous word;
identifying a set of candidate word objects corresponding to at least a first one of the string objects and a second one of the string objects, wherein identifying the set of candidate word objects corresponding to the first string object comprises identifying, within a word database, one or more related unambiguous words associated with a relatively high frequency within a language associated with the input text;
determining a selected candidate word object based on a contextual relationship and a positional relationship between the one or more candidate word objects corresponding to the first string object and the one or more candidate words corresponding to the second string object; and
outputting the selected candidate word object corresponding to the first string object and one or more candidate word objects corresponding to the second string object.

2. The method of claim 1, wherein the determining the selected candidate word object comprises determining whether one or more candidate word objects corresponding to the first string object are statistically likely to occur in the context of one or more candidate word objects corresponding to the second string object.

3. The method of claim 2, wherein the first string object precedes the second string object within the input text.

4. The method of claim 2, wherein the first string object is separated from the second string object by at least one other string object.

5. The method of claim 2, further comprising outputting a second selected candidate word object corresponding to the first string object and one or more candidate word objects corresponding to the second string object.

6. The method of claim 5, wherein identifying the set of candidate word objects corresponding to at least the first one of the string objects and the second one of the string objects occurs before outputting the second selected candidate word object.

7. The method of claim 2, further comprising receiving a confirmation input and replacing the first string object with the selected word object upon receiving the confirmation input.

8. An electronic device comprising a processor, the processor configured to:
receive, by the processor, an input text comprising a set of string objects, each object comprising a single possibly ambiguous word;
identify a set of candidate word objects corresponding to at least a first one of the string objects and a second one of the string objects, wherein identifying the set of candidate word objects corresponding to the first string object comprises identifying, within a word database, one or more related unambiguous words associated with a relatively high frequency within a language associated with the input text;
determine a selected candidate word object based on a contextual relationship and a positional relationship between the one or more candidate word objects corresponding to the first string object and the one or more candidate words corresponding to the second string object; and
output the selected candidate word object corresponding to the first string object and one or more candidate word objects corresponding to the second string object.

9. The electronic device of claim 8, wherein determining the selected candidate word object comprises determining whether one or more candidate word objects corresponding to the first string object are statistically likely to occur in the context of one or more candidate word objects corresponding to the second string object.

10. The electronic device of claim 9, wherein the first string object precedes the second string object within the input text.

11. The electronic device of claim 9, wherein the first string object is separated from the second string object by at least one other string object.

12. The electronic device of claim 9, wherein the processor is further configured to:
output a second selected candidate word object corresponding to the first string object and one or more candidate word objects corresponding to the second string object.

13. The electronic device of claim 12, wherein identifying the set of candidate word objects corresponding to at least the first one of the string objects and the second one of the string objects occurs before outputting the second selected candidate word object.

14. The electronic device of claim 9, wherein the processor is further configured to receive a confirmation input and replace the first string object with the selected word object upon receiving the confirmation input.

15. A non-transitory computer readable medium storing a set of instructions that are executable by an electronic device to cause the electronic device to perform a method, the method comprising:
receiving, by the processor, an input text comprising a set of string objects, each object comprising a single possibly ambiguous word;
identifying a set of candidate word objects corresponding to at least a first one of the string objects and a second one of the string objects, wherein identifying the set of candidate word objects corresponding to the first string object comprises identifying, within a word database, one or more related unambiguous words associated with a relatively high frequency within a language associated with the input text;
determining a selected candidate word object based on a contextual relationship and a positional relationship between the one or more candidate word objects corresponding to the first string object and the one or more candidate words corresponding to the second string object; and
outputting the selected candidate word object corresponding to the first string object and one or more candidate word objects corresponding to the second string object.

* * * * *